No. 889,708. PATENTED JUNE 2, 1908.
U. G. MIGNEREY.
HOG TANK.
APPLICATION FILED SEPT. 25, 1907.
2 SHEETS—SHEET 1.
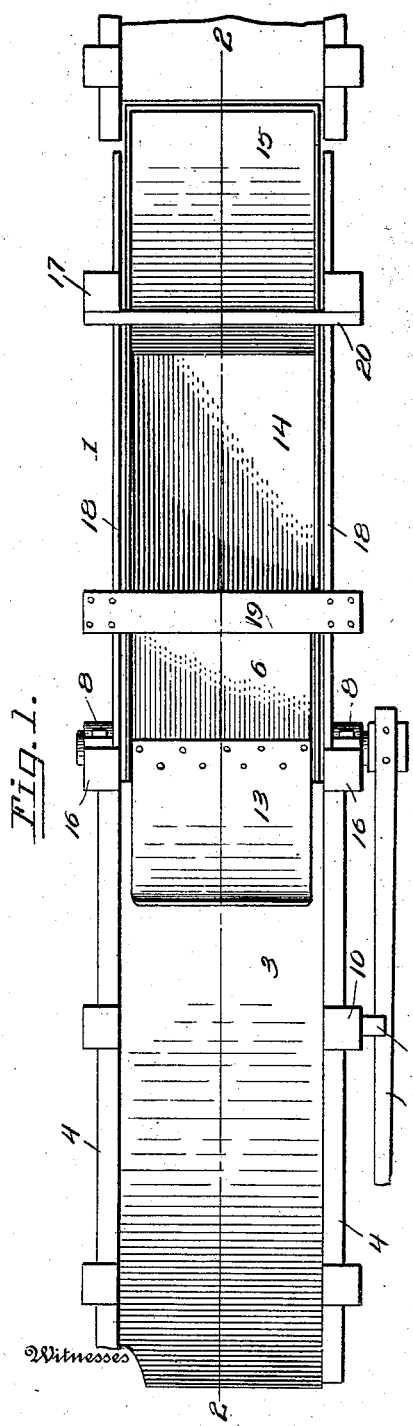
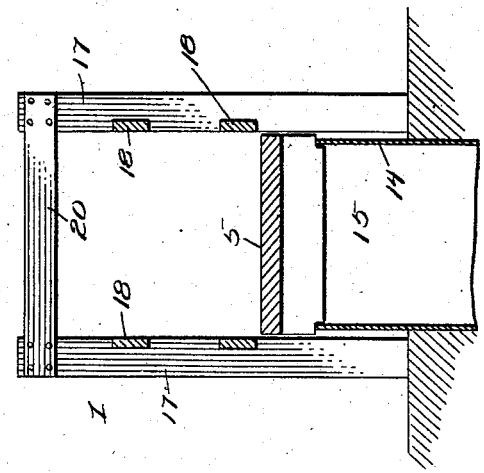
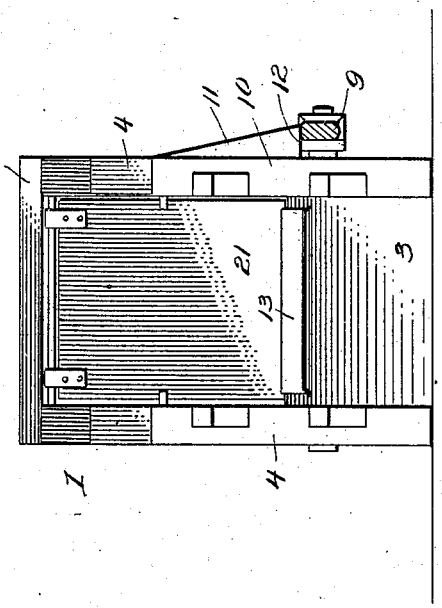
Witnesses
F. C. Gibson.
J. W. Garner
Inventor
Ulysses G. Mignerey.
By Victor J. Evans
Attorney

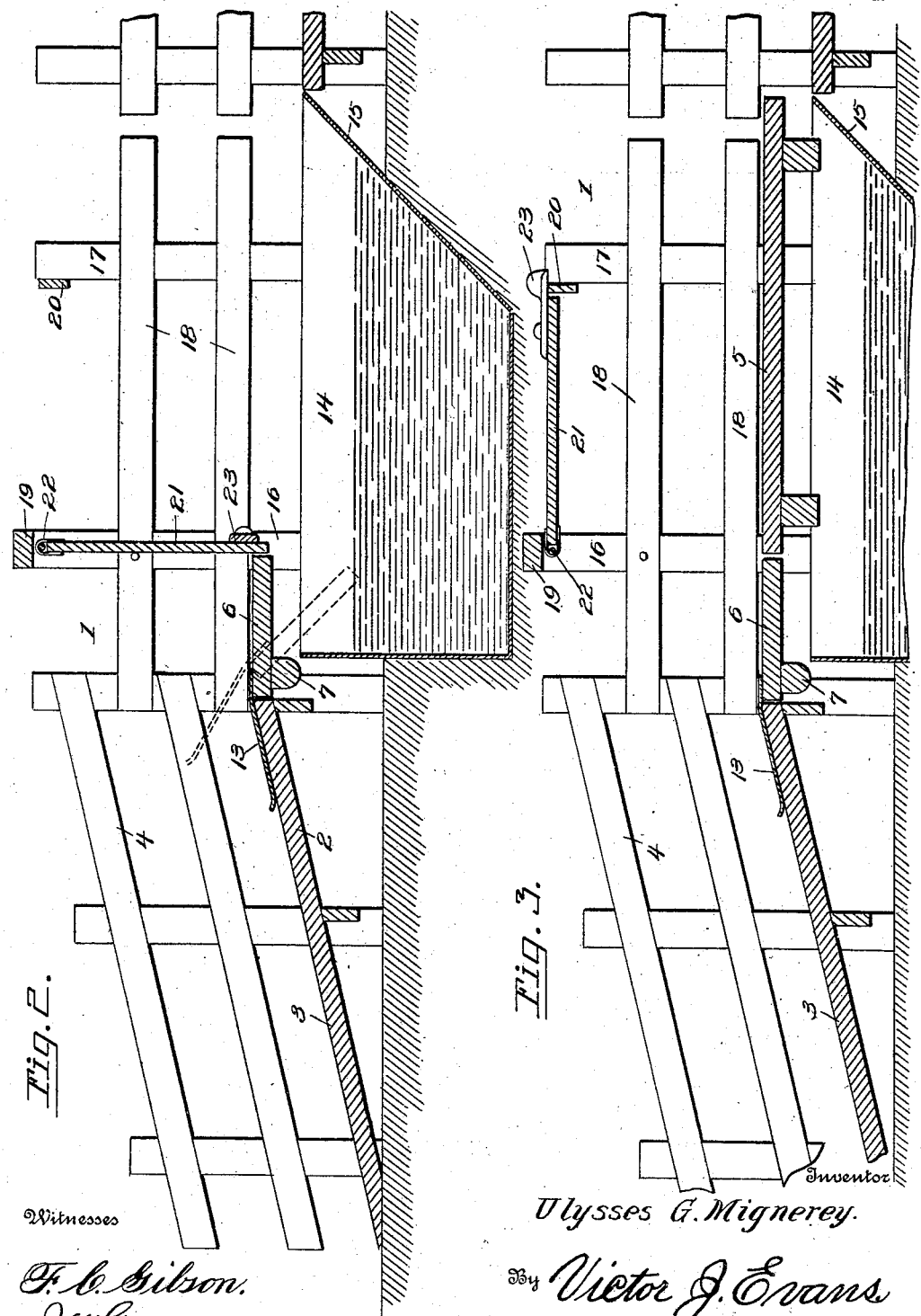

UNITED STATES PATENT OFFICE.

ULYSSES G. MIGNEREY, OF JULIAN, NEBRASKA.

HOG-TANK.

No. 889,708.      Specification of Letters Patent.      Patented June 2, 1908.

Application filed September 25, 1907. Serial No. 394,541.

*To all whom it may concern:*

Be it known that I, ULYSSES G. MIGNEREY, a citizen of the United States of America, residing at Julian, in the county of Nemaha and State of Nebraska, have invented new and useful Improvements in Hog-Tanks, of which the following is a specification.

This invention relates to improvements in chutes for loading hogs, sheep and other animals on and unloading the same from railway cars, and comprises a chute having a tank under a portion thereof and means to cause the animals to be precipitated in the tank while passing across the chute to enable the animals to be subjected to the action of a medicated bath for the treatment of certain diseases and also for disinfecting or sanitary purposes, and the said invention consists in the construction, combination and arrangement of devices hereinafter described and claimed.

In the accompanying drawings,—Figure 1 is a top plan view of a chute constructed in accordance with this invention. Fig. 2 is a vertical longitudinal sectional view of the same, taken on the plane indicated by the line 2—2 of Fig. 1, and showing the floor section over the tank removed, the gate in a closed position and the trap door in position for operation. Fig. 3 is a similar view of the same, showing the gate open, the removable floor section in place and the trap door in normal position. Fig. 4 is an end elevation of the same. Fig. 5 is a vertical transverse sectional view of the same.

The chute 1 may in its general structure be of any suitable construction, and the same is provided at one end with an inclined inlet portion 2 comprising an inclined floor 3 and side frames 4. The main portion of the chute is provided with a removable floor section 5 and with a trap door 6, such trap door being located at the upper end of the inclined floor 3 and having a supporting rock shaft or axle 7 at one end which is mounted in bearings 8 secured to the side frames 4. On one end of the said rock shaft or axle, which forms the pivot for the trap door, is secured one end of an operating and locking bar or lever 9 which is made of elastic material, such as wood, so that its outer end may be sprung laterally to engage it with the lower end of the triangular cam block 10, which is secured on the outer side of one of the side frames 4, its inclined outer face 11 acting as a cam to move the free end of the lever bar 9 outwardly, as such lever bar is turned downwardly to dispose the trap door 6 in initial, horizontal position, and the lower end of the said cam block forming a locking shoulder 12, under which the said lever bar springs when the said lever bar and the said trap door reach a horizontal position, so that such cam block and lever bar coact to lock and support the said trap door in horizontal position. The trap door is provided at its pivoted or front end on its upper side with a plate 13 which bears on the inclined floor 3 when such trap door is in horizontal position, as shown.

The removable floor section 5 of the main portion of the chute when in place rests on the side walls of a tank 14 which is disposed under the main portion of the chute and which is of suitable size to subject animals which drop in the same to a bath. The rear end of the said tank is inclined, as at 15, to enable the animals to get out of the same and continue on their way across the chute after having fallen into and been bathed in the said tank.

The side frames of the main portion of the chute comprise posts 16, 17 and longitudinally disposed bars or rails 18, and the upper ends of the said posts 16 are connected together by a transversely disposed plate 19, the upper ends of the posts 17 being connected together by a transversely disposed bar 20. A gate 21, which is disposed to swing in a vertical plane, has its upper end hinged or pivotally mounted, as at 22, between the upper ends of the posts 16. The said gate drops by gravity to the normal, closed position shown in Fig. 2 and is provided at its lower end with a latch or other suitable locking element 23, which when the said gate is open and disposed in elevated horizontal position, as shown in Fig. 3, is adapted to be turned to cause it to bear on the cross bar 20 and coact with such cross bar to support such gate in such elevated position.

When the chute is to be used merely for loading animals into or unloading them from cars, the same is arranged as shown in Fig. 3, with the trap door 6 closed and locked, the floor section in place, and the gate 21 in elevated open position, so that the chute is entirely unobstructed, and animals may be readily driven therethrough in either direction. When the chute is to be used for dipping the animals the same is arranged as shown in Fig. 2 with the gate 21 in closed position and the lever bar 9 disengaged from the lower end of the cam and stop block 10. The leverage exerted by such bar by reason of the length of the same keeps the trap door normally in closed position, and as an animal in passing over the inclined floor approaches such trap door, its first steps upon the plate 13, which forms an extension of the same, and as it passes from such plate over the pivot axis 7 of such trap door, the latter is caused to open downwardly by the weight of the animal and serves to drop the animal into the tank. The extension 13 prevents the animal from backing from the trap door as the latter opens and also holds the animal next in rear momentarily in check until the trap door is again disposed in horizontal position by the action of the gravitating lever bar 9, so that the trap door operates automatically to drop the animals in succession into the tank.

The gate 21 prevents the animals from turning around in and leaving the tank from the end in which they enter it.

Having thus described the invention, what is claimed as new, is:—

1. An animal chute or drive-way having a removable floor section, a tank under said floor section, a trap door over said tank at the front end of such floor section, means to lock and unlock said trap door, such locking and unlocking means including a lever adapted also for use in operating the trap door, and a gate disposed in the said chute or driveway at a point immediately to the rear of said trap door, said gate being hung at its upper side and when the trap door is in a closed position closing against the rear end of said trap door.

2. An animal chute or driveway having a removable floor section, a tank under said floor section, a trap door over such tank, at the front end of said floor section, a spring bar connected to the trap door to normally dispose and maintain the same in horizontal position, and a cam block on one side of the chute to coact with such spring bar to lock such trap door in closed position.

In testimony whereof I affix my signature, in presence of two witnesses.

ULYSSES G. MIGNEREY.

Witnesses:
   W. E. YOUNG,
   TOBIAS KLINGER.